US009523301B2

(12) United States Patent
Kohut

(10) Patent No.: US 9,523,301 B2
(45) Date of Patent: Dec. 20, 2016

(54) REDUCING AGENT METERING SYSTEM WITH LEAK MONITORING

(71) Applicant: Albonair GmbH, Dortmund (DE)

(72) Inventor: Thomas Kohut, Bochum (DE)

(73) Assignee: Albonair GmbH, Dortmund (DE)

( * ) Notice: Subject to any disclaimer, the term of this patent is extended or adjusted under 35 U.S.C. 154(b) by 0 days.

(21) Appl. No.: 14/684,403

(22) Filed: Apr. 12, 2015

(65) Prior Publication Data

US 2015/0292381 A1    Oct. 15, 2015

(51) Int. Cl.
| | | |
|---|---|---|
| *F01N 3/00* | (2006.01) | |
| *F01N 3/20* | (2006.01) | |
| *F01N 3/24* | (2006.01) | |
| *F01N 11/00* | (2006.01) | |

(52) U.S. Cl.
CPC ............... *F01N 3/20* (2013.01); *F01N 3/2066* (2013.01); *F01N 3/24* (2013.01); *F01N 11/00* (2013.01); *F01N 2470/24* (2013.01); *F01N 2550/05* (2013.01); *F01N 2560/12* (2013.01); *F01N 2610/02* (2013.01); *F01N 2610/08* (2013.01); *F01N 2610/148* (2013.01); *F01N 2610/1473* (2013.01); *F01N 2610/1486* (2013.01); *F01N 2900/0414* (2013.01); *F01N 2900/1818* (2013.01); *Y02T 10/24* (2013.01); *Y02T 10/47* (2013.01)

(58) Field of Classification Search
USPC .............. 60/274, 286, 289, 292, 295, 297, 301, 60/303
See application file for complete search history.

(56) References Cited

U.S. PATENT DOCUMENTS

| | | | | |
|---|---|---|---|---|
| 4,684,786 A | * | 8/1987 | Mann ................... | F02M 31/125 123/549 |
| 7,000,383 B2 | * | 2/2006 | van Nieuwstadt . | B01D 53/9431 60/286 |
| 7,644,577 B2 | * | 1/2010 | Linna ................. | B01D 53/9495 239/409 |
| 8,281,573 B2 | * | 10/2012 | Bruck .................... | B01B 1/005 422/173 |

(Continued)

FOREIGN PATENT DOCUMENTS

| | | |
|---|---|---|
| DE | 10332289 | 2/2005 |
| DE | 10353311 | 6/2005 |

(Continued)

OTHER PUBLICATIONS

German Search Report Dec. 18, 2014.

*Primary Examiner* — Binh Q Tran
(74) *Attorney, Agent, or Firm* — Law Offices of Robert F. Zielinski LLC

(57) ABSTRACT

The invention relates to a reducing agent metering system for injecting a reducing agent into the exhaust gas stream of a combustion engine for selective catalytic reduction, with a feed pump, by means of which reducing agent is conveyed from a reducing agent tank via a delivery line and is introduced via at least one nozzle into the exhaust gas stream of the combustion engine, whereby the delivery line is formed by a hose (1) that has on the outside an electrical conductor (2) that encloses the hose (1) like a jacket, whereby the reducing agent metering system has a monitoring unit by means of which the electrical conductivity between the reducing agent in the hose (1) and the electrical conductor (2) is monitored.

16 Claims, 1 Drawing Sheet

(56) References Cited

U.S. PATENT DOCUMENTS

| | | | |
|---|---|---|---|
| 8,661,785 B2* | 3/2014 | Levin | F01N 3/208 |
| | | | 60/274 |
| 8,820,052 B2* | 9/2014 | Levin | F01N 3/2066 |
| | | | 60/274 |
| 9,133,751 B2* | 9/2015 | Gottwald | F01N 3/2066 |

FOREIGN PATENT DOCUMENTS

| | | |
|---|---|---|
| DE | 10 2006 051926 | 5/2008 |
| DE | 10 2010 062333 | 6/2012 |

\* cited by examiner

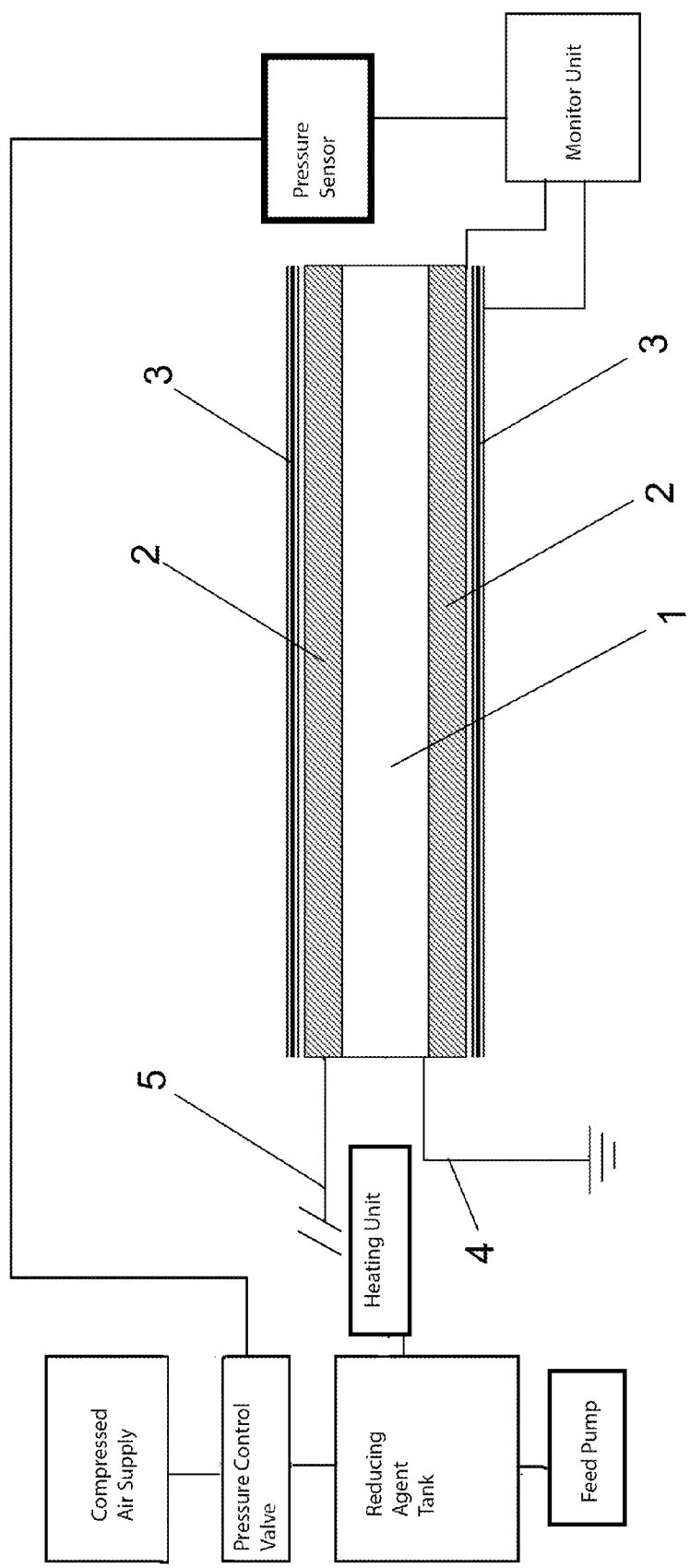

REDUCING AGENT METERING SYSTEM WITH LEAK MONITORING

The invention relates to a reducing agent metering system for injecting a reducing agent into the exhaust gas stream of a combustion engine for selective catalytic reduction, with a feed pump, by means of which reducing agent is conveyed from a reducing agent tank via a delivery line and is introduced via at least one nozzle into the exhaust gas stream of the combustion engine.

The invention also relates to a method for operating a reducing agent metering system for injecting a reducing agent into the exhaust gas stream of a combustion engine for selective catalytic reduction, with a feed pump, by means of which reducing agent is conveyed from a reducing agent tank via a delivery line and is introduced via at least one nozzle into the exhaust gas stream of the combustion engine.

Catalysts for selective catalytic reduction, so-called SCR catalysts (English: selective catalytic reduction, SCR for short), are used in order to reduce the emission of nitrogen oxide from diesel engines, combustion systems, garbage incinerators, industrial plants, and the like. To this end, a reducing agent is sprayed into the exhaust gas system with a metering device. As a reducing agent, ammonia or an ammonia solution or another reducing agent is used.

Since carrying ammonia in motor vehicles is critical from a safety standpoint, urea in aqueous solution with a proportion of urea of usually 32.5% is used, in particular according to DIN 70070. In exhaust gas, the urea decomposes at temperatures above 150° Celsius in gaseous ammonia and $CO_2$. Parameters for the decomposition of urea are essentially time (evaporation time and reaction time), temperature, and droplet size of the sprayed urea solution. In these SCR catalysts, the discharge rate of nitrogen oxides is reduced by approximately 90% by selective catalytic reduction.

In the known reducing agent metering systems for injecting a reducing agent into the exhaust gas stream of a combustion engine for selective catalytic reduction, the reducing agent solution is conveyed to the nozzle by means of a diaphragm pump or a reciprocating pump. In this case, the monitoring of the metering system by evaluating the measuring signal of a NOx sensor, which is arranged in the exhaust gas system behind the catalyst, is carried out. In this case, it is disadvantageous that this signal is not accurate enough to detect a leak in the reducing agent delivery line. A monitoring of the metering over a certain period by means of a comparison between the conveyed metering amount and the change in the tank fill level can be done with sufficient accuracy, but this procedure would not be able to ensure that actually the entire conveyed metering amount was also introduced into the exhaust gas system and that there is no leak, for example, in the delivery line.

The object of the invention is to further form a reducing agent metering system of the above-mentioned type in such a way that a leak in the reducing agent delivery line can be reliably detected.

Another object of the invention is to indicate a method for operating a reducing agent metering system, which makes possible the monitoring of the metering and the detection of a leak in the reducing agent delivery line.

This object is achieved according to the invention by a reducing agent metering system according to claim 1 and by a method for operating a reducing agent metering system according to claim 13. Advantageous further developments of the invention are indicated in the respective dependent claims.

In the case of the reducing agent metering system for injecting a reducing agent into the exhaust gas stream of a combustion engine for selective catalytic reduction, with a feed pump, by means of which reducing agent is conveyed from a reducing agent tank via a delivery line and is introduced via at least one nozzle into the exhaust gas stream of the combustion engine, it is especially advantageous that the delivery line is formed by a hose that has on the outside an electrical conductor that encloses the hose like a jacket, whereby the reducing agent metering system has a monitoring unit by means of which the electrical conductivity between the reducing agent in the hose and the electrical conductor is monitored.

In particular, the reducing agent metering system can have a pump unit containing the feed pump. In addition to the feed pump, this pump unit can have other components, in particular shift valves and/or sensors. Below, the term hose is used synonymously with the term line or delivery line.

The term delivery line can in this case be used to refer to both the suction line between the tank and the feed pump and also the pressure line between/from [sic] the feed pump to the nozzle; i.e., the suction line between the tank and the feed pump and/or the pressure line from the feed pump to the nozzle can be formed by a hose, which has on the outside an electrical conductor that encloses the hose like a jacket.

In the case of the method for operating a reducing agent metering system for injecting a reducing agent into the exhaust gas stream of a combustion engine for selective catalytic reduction with a feed pump, by means of which reducing agent is conveyed from a reducing agent tank via a delivery line and is introduced via at least one nozzle into the exhaust gas stream of the combustion engine, it is especially advantageous that the delivery line is formed by a hose, which has on the outside an electrical conductor that encloses the hose like a jacket, whereby the reducing agent metering system has a monitoring unit, by means of which the electrical conductivity between the reducing agent in the hose and the electrical conductor is monitored.

For the purposes of the invention, the terms reducing agent metering system and metering system are used synonymously. The term reducing agent solution or reducing agent encompasses any reducing agent that is suitable for selective catalytic reduction; preferably in this connection, a urea solution according to DIN 70070 is used. The invention is not limited thereto, however.

The metering pump can be in particular a membrane pump or a reciprocating pump or a centrifugal pump or an orbital pump or a gear pump. Preferably, the feed pump is pressure-limited and/or a pressure relief valve can be integrated into the delivery line between the feed pump and the metering chamber.

In a preferred overall arrangement, the reducing agent metering system has a tank into which the reducing agent solution is loaded and from which the reducing agent solution is taken and conveyed by means of the feed pump and is introduced via at least one nozzle into the exhaust gas stream of the combustion engine.

According to the invention, monitoring of the electrical conductivity thus is done between the electrically-conductive liquid conveyed in the hose and the electrical conductor that is arranged on the hose enclosing the hose over an extensive area on the outside. The jacket-like conductor thus encloses the hose over an extensive area and is not designed, for example, just in a line-like manner. In the event of a leak, for example by an external influence, which results in a hole or crack in the hose, a short-circuit results between the conveyed liquid and the electrical conductor that is arranged on the hose on the outside. Since the conductor encloses the hose like a jacket over an extensive area, i.e., on the entire surface of the hose, the conductor is wetted by the conveyed reducing agent solution independently of the random positioning of damage of the hose, so that it results in a short-circuit, i.e., in an electrically-conductive connection of the conveyed liquid to the external electrical conductor. A leak of the hose can be reliably detected by a permanent monitoring of the electrical conductivity, i.e., by the detection of a sudden drop in electrical resistance between the conveyed liquid and the external electrical conductor. If such a leak of the hose is detected, the latter can be indicated on a display unit by a corresponding display and/or can be written to and stored in an error register of the metering system. The conductor that encloses the hose on the outside has a connecting area for bringing the electrical conductor into contact with the monitoring unit.

The urea solution that is usually used as a reducing agent solution, in particular according to DIN 70070, is an electrically-conductive liquid. For permanent monitoring of the electrical conductivity between the conveyed liquid and the external electrical conductor that encloses the hose over an extensive area, a metal point in the metering system, which is wetted by the reducing agent solution during the metering operation, is connected in front of or behind the hose to ground. As long as the hose is undamaged and no leak occurs, the hose acts as an insulator between the conveyed liquid and the external electrical conductor.

It is especially advantageous that the external electrical conductor encloses the hose over an extensive area, i.e., covers the surface of the hose, so that even the smallest leaks, independently of their positioning on the surface of the hose, immediately result in an electrically-conductive connection to the external electrical conductor, and the leak is detected.

Preferably, the conductor is formed by an electrically-conductive wire mesh and/or an electrically-conductive foil. By such a configuration of the conductor enclosing the hose over an extensive area and arranged on the hose on the outside, it is ensured that the entire surface of the hose is overlapped by the conductor and in this way, any leak can be detected immediately.

In a preferred embodiment, on the outside, the conductor has a protective layer and/or a layer for insulation from the environment. The conductor is protected and electrically insulated from the environment by such a protective layer. In this way, the reliability of the leak monitoring is ensured.

The hose can thus be configured in a sandwich-like manner. On the inside, the hose is formed by the internal hose that carries reducing agent, a hose that on the outside has an electrically-conductive wire mesh and/or an electrically-conductive foil, which in turn is protected from the environment toward the outside by a protective layer and/or an insulation layer and is electrically insulated. As long as the hose does not have any leak, the internal hose that carries reducing agent thus forms an electrical insulator between the conveyed reducing agent and the wire mesh and/or the foil. Wire mesh and/or foil in turn are protected toward the outside relative to the environment by a protective layer and also are electrically insulated relative to the environment.

As an alternative, the conductor, in particular a wire mesh and/or a foil, can be embedded in the material matrix of the hose. In particular, in this way, the arrangement, required for the leak monitoring, of an electrical conductor that encloses the hose over an extensive area can be embedded in the material of the hose in an especially advantageous way. The hose then has a corresponding connecting area to bring the electrical conductor into contact with the monitoring unit.

The system especially preferably has a compressed air supply, and the reducing agent is sprayed inside or outside of the nozzle by means of compressed air. In this case, the compressed air supply can have a shift valve and/or a pressure control valve. This shift valve is used for the control, i.e., the switching on and off, of the compressed air supply for the entire metering system or a portion thereof.

As an alternative or cumulatively, the compressed air supply can have a pressure control valve. In this way, the compressed air can be set at a pressure level that is desired for spraying the reducing agent by means of compressed air. The compressed air itself can be taken from an on-board compressed air system, for example of a service vehicle, in whose exhaust gas section the metering system is arranged, without the system pressure prevailing in the compressed air system representing a limitation, since the pressure of the compressed air can be dropped to the desired pressure.

In a preferred embodiment of the reducing agent metering system, a compressed air supply is accordingly provided, whereby the reducing agent is sprayed inside or outside of the nozzle by means of compressed air. For spraying the reducing agent, a mixing chamber can be provided, within which a spraying of the reducing agent by means of the compressed air is carried out even before the introduction into the exhaust gas section. In a preferred embodiment, however, the nozzle is designed as an outward-mixing binary nozzle, in which the reducing agent solution exits from a first nozzle opening and compressed air exits from a second nozzle opening, whereby the two nozzle openings are oriented to one another in such a way that the compressed air sprays the reducing agent outside of the nozzle so that the nozzle is designed as an outward-mixing binary nozzle and the formation of aerosol takes place outside of the nozzle.

In a preferred embodiment, the hose is encased by an external hose, whereby compressed air is conveyed by the external hose to the nozzle that is used for spraying the reducing agent.

The delivery line can thus also be formed by a double-walled hose with an internal hose within an external hose, whereby the reducing agent is conveyed by the internal hose. A more flexible double-walled hose in this case offers in particular the advantage that the latter is flexible and bendable and thus is suitable to offset vibrations, as they typically occur in motor vehicles, service vehicles, and the like, without a crack occurring in the delivery line. In this case, compressed air is conveyed through the external hose to the nozzle, which is used for spraying the reducing agent.

Preferably, the hose or internal hose in the case of a double-walled embodiment and/or the pump unit has a temperature sensor and/or a pressure sensor. In the case of a double-walled embodiment of the delivery line as a hose that conveys the reducing agent solution with an external hose that encases the hose, alternatively or cumulatively the external hose can have a temperature sensor and/or a pressure sensor.

Such sensor arrangements on the internal hose and/or on the external hose and/or in the pump unit can also be formed by combined temperature and pressure sensors. By means of such sensors, the pressure and/or the temperature can be detected and thus monitored in the internal hose and/or in the external hose and/or in the pump unit.

Preferably, the system has a heating device for heating the reducing agent solution. Based on its water content, the reducing agent solution according to DIN 70070 that is used in many cases freezes at approximately −11° C. Therefore, it is necessary to provide a heating device for heating the reducing agent solution for the case of very low ambient temperatures.

In an especially preferred embodiment, the system has a heating device for heating air, in particular compressed air, for introduction into an external hose that encases the hose. In this way, an arrangement can be provided in which a heating of the reducing agent solution conveyed in the internal hose is carried out by means of the heated fluid that is located in the external hose, so that a freezing of the reducing agent solution between the feed pump and nozzle is reliably prevented.

Preferably, the hose that conveys the reducing agent is connected to the nozzle via a support. An external hose that conveys compressed air and that encases the hose is especially preferably connected to the nozzle via an outer support.

In a preferred embodiment, the nozzle has two connecting pieces, whereby the hose that carries reducing agent is connected to the nozzle via the first supports, and an external hose that encases the hose that carries compressed air is connected to the nozzle via the two supports, whereby the nozzle is an outward-mixing binary nozzle. In this case, the nozzle can be designed as a more compact nozzle body. In the case of the outward-mixing binary nozzle, the formation of aerosol thus is carried out outside of the nozzle body. Therefore, the outlet openings of the nozzle for the reducing agent solution, on the one hand, and the compressed air, on the other hand, are positioned with respect to one another in such a way that the compressed air is directed onto the reducing agent jet exiting from the nozzle and sprays the reducing agent, so that the desired droplet size is restored and the aerosol is formed outside of the nozzle. In this case, a mixing chamber upstream from the nozzle can be eliminated.

Independently of the configuration of the delivery line as a single-walled or double-walled hose, this is preferably an outside-mixing sprayer nozzle, i.e., the formation of aerosol is carried out outside of the nozzle body by the reducing agent solution being directed via a first nozzle opening or a first group of nozzle openings into the exhaust gas system, whereby compressed air is directed via a second nozzle opening or a second group of nozzle openings into the exhaust gas system, whereby the first nozzle opening/first group of nozzle openings and the second nozzle opening/second group of nozzle openings are arranged with respect to one another in such a way that the compressed air exits from the nozzle body at an angle relative to the jet direction of the reducing agent, so that outside of the nozzle body, the reducing agent is sprayed by means of compressed air and thus a formation of aerosol is carried out outside of the nozzle. In this case, in particular the air outlet opening can be arranged as a concentric annular gap around a central first nozzle opening, whereby the reducing agent exits through the central first nozzle opening. This concentric annular gap can also be designed in such a way that a group of nozzle openings on a circular line or the like is arranged around a central outlet opening for the reducing agent.

The connecting pieces of the nozzle, to which the hose that conveys the reducing agent and optionally an external hose that encases the hose that carries compressed air can be connected, can be designed as smooth supports over which the hose ends are pushed. The connecting pieces can be configured, however, in such a way that the latter have one or more peripheral undercuts on their external periphery, undercuts over which the hose end is pushed, in order to impede removal of the hose from the support, as is usually done with hose clips. These projections that extend around the supports can be tilted toward the front in order to make it easier to push the hose ends onto the supports. One or more of these peripheral projections and undercuts can be provided on each support.

The hose that conveys reducing agent is preferably connected to a compressed air supply via a shift valve or control valve in order to remove reducing agent from the hose and the nozzle after completion of the metering by means of compressed air.

In this preferred embodiment of the reducing agent metering system, a compressed air supply is thus provided, whereby the hose conveying reducing agent and thus also the nozzle are connected to the compressed air supply via a shift valve in order to remove reducing agent after completion of the metering by means of compressed air.

In this way, the reducing agent solution can be removed from the hose conveying reducing agent and the nozzle and/or a metering chamber and/or the metering line after completion of the metering by means of compressed air in order to prevent freezing or crystallization of the reducing agent solution. In this way, damage from frost and clogging can be effectively prevented.

The compressed air can thus be used alternatively or cumulatively for spraying reducing agent into the exhaust gas system and for purifying the lines that carry reducing agent after completion of the metering.

Preferably, the pressure in the hose is detected and monitored by means of a pressure sensor. By such a detection and monitoring of the pressure in the hose that carries reducing agent, the correct functioning of the feed pump and the metering can be monitored continuously.

In the method for operating a reducing agent metering system for injecting a reducing agent into the exhaust gas stream of a combustion engine for selective catalytic reduction, compressed air is conveyed to the nozzle in an especially advantageous further development through an external hose that encases the hose, by means of which nozzle the reducing agent is sprayed inside or outside of the nozzle, whereby the pressure is detected and monitored in the external hose by means of a pressure sensor.

In particular, during breaks in delivery, the pressure in the hose that carries reducing agent and/or in the external hose that encases the hose can be compared to stored exhaust-gas back-pressure characteristic diagrams. In particular, in this case, the measured time plot of pressure in the hose that carries reducing agent and/or the measured time plot of pressure in the external hose can be compared to stored exhaust-gas back-pressure characteristic diagrams.

Preferably, a diagnostic routine is performed, in which air pressure pulsations are generated, and the pressure in the hose that carries reducing agent is detected and monitored. This can encompass in particular the detection and evaluation of the time plot of the pressure in the hose that carries reducing agent.

The reducing agent and/or compressed air are especially preferably heated at ambient temperatures below the melting point of the reducing agent.

After the metering is completed, the delivery line and/or the metering chamber and/or the hose that carries reducing agent is/are preferably connected to a compressed air supply via a shift valve in order to remove reducing agent by means of compressed air.

In this way, the reducing agent solution can be removed from the delivery line, i.e., the hose that carries reducing agent, and the nozzle and/or the metering chamber and/or the metering line after completion of the metering by means of compressed air in order to prevent freezing or crystallization of the reducing agent solution. In this way, damage from frost and clogging can be effectively prevented.

The compressed air can thus be used alternatively or cumulatively for spraying reducing agent into the exhaust gas system and for purifying the lines that carry reducing agent after completion of the metering.

An embodiment of the invention is depicted in the FIGURE and is explained in more detail below.

FIG. 1 shows a sectional view of a section of the delivery line of a reducing agent metering system.

FIG. 1 shows a sectional view of a section of the delivery line of a reducing agent metering system. The delivery line is formed by a hose 1, through which reducing agent flows during the metering operation. Urea solution according to DIN 70070 is preferably used as a reducing agent. As an alternative, however, any other electrically-conductive reducing agent can also be used.

The outside wall of the metering hose 1 has an electrical conductor 2 in the form of a metal layer made of a wire mesh 2. The metal layer in the form of wire mesh and/or foil 2 is electrically insulated by the insulating layer 3 against environmental influences from the outside and is protected against environmental influences. The delivery line, as it is depicted in FIG. 1, consequently has a rotationally-symmetrical design. The metal mesh 2 thus encloses the hose 1 over an extensive area and forms a sort of electrically-conductive outer jacket around the hose 1. The wire mesh 2 is protected from external influences and at the same time is electrically insulated by the insulating layer 3. The delivery line of a reducing agent metering system depicted in FIG. 1 is flexible and in this way bendable, so that the delivery line can be adapted to the installation situation of the reducing agent metering system. In this case, the delivery line has, in a rotationally-symmetrical manner, a sandwich-like design with internal hose 1, wire mesh 2 encompassing the hose like a jacket, and external insulating layer 3.

An electrically-conductive area, loaded with the metering agent, in the inside of the hose 1 is connected in an electrically-conductive manner to ground via the connection 4. A connector 5 connects to the metal wire mesh 2, via which the metal wire mesh 2 is connected to a monitoring unit of the reducing agent metering system, not depicted in the FIGURE, by means of which system the electrical conductivity between the reducing agent in the interior of the hose 1 and the wire mesh 2 is monitored.

In the event of a leak of the metering hose 1, the medium that exits because of the damage penetrates to the wire mesh 2, which encloses the hose 1, and causes an electrically-conductive connection between the medium in the metering line 1 and the wire mesh 2. To detect leaks, the conductivity between the electrically-conductive reducing agent in the metering line 1 and the wire mesh 2 is thus measured and monitored. To this end, a metal point, which is wetted by the reducing agent during the metering operation, is connected in front of or behind the metering hose 1 to ground via the contact 4. As long as there are no leaks, the metering hose 1 acts as an electrical insulator between the reducing agent conveyed in the metering hose 1 and the wire mesh 2; i.e., an electrical conductivity based on the action of the hose 1 as an electrical insulator does not exist.

As a result of the wire mesh 2 encasing the metering hose 1 in the event damage of the hose 1 occurs, the wire mesh 2 is necessarily wetted with the conveyed reducing agent, so that an electrically-conductive connection in the form of a short-circuit is produced, which can be detected by a corresponding monitoring unit via the connector contact 5. In this case, a corresponding alert can be produced and/or the possibility exists of writing and storing a corresponding notation in an error register of the metering system.

In a further embodiment of the invention, not depicted, the metering hose depicted in FIG. 1 is surrounded by another external hose, which completely encases the arrangement according to FIG. 1 and forms an intermediate space. In this case, this external annular cross-section is used in order to transport compressed air to the injection nozzle, which is used to spray the reducing agent that is to be injected. In this way, an especially advantageous arrangement of a leak-monitored hose 1 for transport of the metering agent is produced, whereby the same line has an external annular gap through which compressed air for spraying the reducing agent is conveyed to the metering nozzle. In this way, an arrangement that overall is very compact and is advantageous with integrated leak monitoring is produced by monitoring electrical conductivity between the wire mesh 2 and the reducing agent that is conveyed in the hose 1.

The invention claimed is:

1. Reducing agent metering system for injecting a reducing agent into the exhaust gas stream of a combustion engine for selective catalytic reduction, with a feed pump, by means of which reducing agent is conveyed from a reducing agent tank via a delivery line and is introduced via at least one nozzle into the exhaust gas stream of the combustion engine, wherein the delivery line is formed by a hose (1) that has on the outside an electrical conductor (2) that encloses the hose (1) like a jacket, whereby the reducing agent metering system has a monitoring unit by means of which the electrical conductivity between the reducing agent in the hose (1) and the electrical conductor (2) is monitored.

2. A metering system according to claim 1, wherein the conductor (2) is formed by an electrically-conductive wire mesh or an electrically-conductive foil.

3. A metering system according to claim 1, wherein the hose (1) empties into the nozzle, whereby the nozzle or the metering system is/are coupled in an electrically-conductive manner to ground (4).

4. A metering system according to claim 1, wherein the conductor (2) on the outside has a protective layer or a layer (3) for insulation from the environment.

5. A metering system according to claim 1, wherein the conductor (2), in particular a wire mesh or a foil, is embedded in the material matrix of the hose (1).

6. A metering system according to claim 1, wherein the system has a compressed air supply and the reducing agent inside or outside of the nozzle is sprayed by means of compressed air, in particular wherein the compressed air supply has a shift valve or a pressure control valve.

7. A metering system according to claim 1, wherein the hose (1) is encased by an external hose, whereby compressed air is conveyed to the nozzle through the external hose, which nozzle is used for spraying the reducing agent.

8. A metering system according to claim 1, wherein the system has a heating device for heating the reducing agent solution or wherein the system has a heating device for heating air, in particular compressed air, for introduction into an external hose that encases the hose (1).

9. A metering system according to claim 1, wherein the hose (1) is connected to the nozzle.

10. Metering system according to claim 1, wherein an external hose that conveys compressed air that encases the hose (1) is connected to the nozzle.

11. A metering system according to claim 1, wherein the nozzle has two connecting pieces, whereby the hose (1) that carries reducing agent is connected to the nozzle and an external hose that encases the hose that carries compressed air is connected to the nozzle, and wherein the nozzle is an outward-mixing binary nozzle.

12. A metering system according to claim 1, wherein the hose (1) is connected via a shift valve or control valve to a compressed air supply in order to remove reducing agent from the hose and the nozzle after completion of the metering by means of compressed air.

13. Method for operating a reducing agent metering system for injecting a reducing agent into the exhaust gas stream of a combustion engine for selective catalytic reduction, with a feed pump, by means of which reducing agent is conveyed from a reducing agent tank via a delivery line and is introduced via at least one nozzle into the exhaust gas stream of the combustion engine, wherein the delivery line is formed by a hose (1) that has on the outside an electrical conductor (2) that encloses the hose (1) like a jacket, whereby the reducing agent metering system has a monitoring unit by means of which the electrical conductivity between the reducing agent in the hose (1) and the electrical conductor (2) is monitored.

14. Method according to claim 13, wherein the pressure in the hose (1) is detected by means of a pressure sensor and is monitored.

15. Method according to claim 13, wherein compressed air is conveyed to the nozzle by an external hose that encases the hose (1), by means of which nozzle the reducing agent is sprayed inside or outside of the nozzle, whereby the pressure in the external hose is detected and monitored by means of a pressure sensor.

16. Method according to one of claims 13, wherein during breaks in delivery, the pressure in the hose (1) or the pressure in an external hose that encases the hose can be compared to stored exhaust-gas back-pressure characteristic diagrams.

* * * * *